Figure 1:
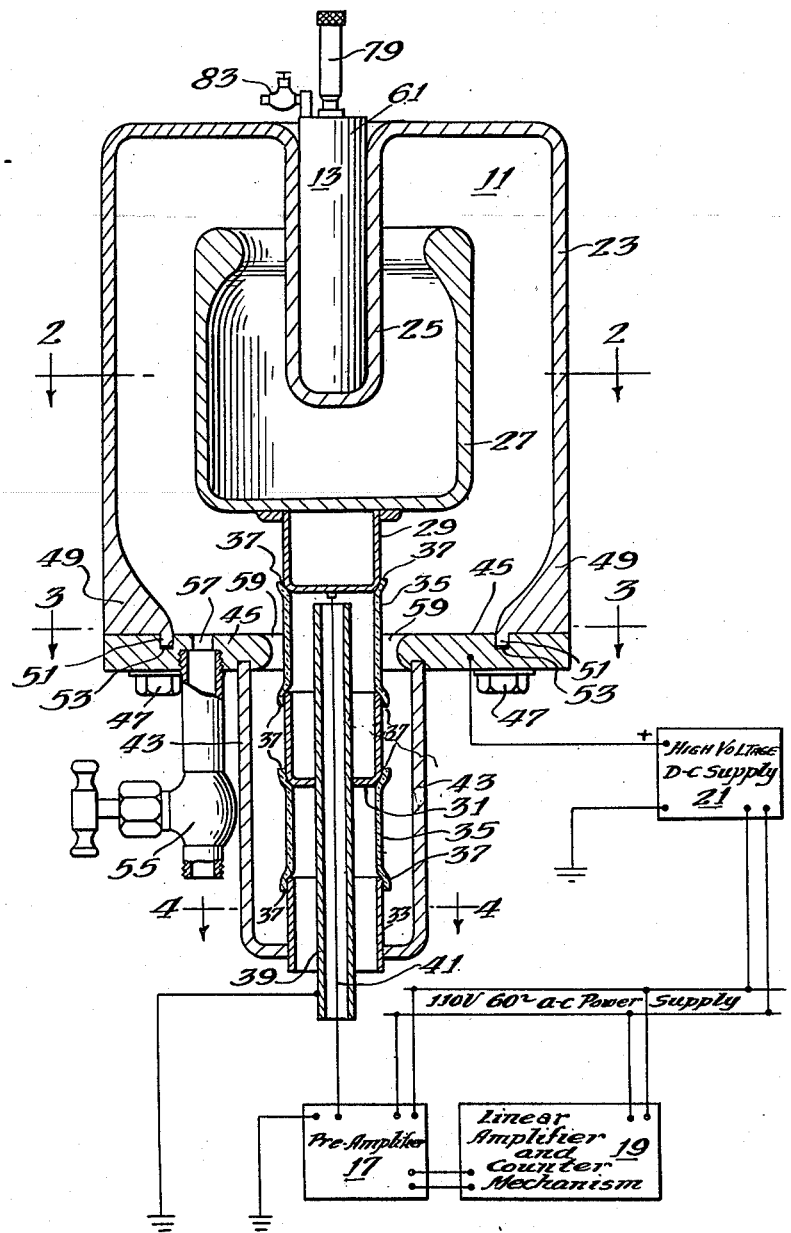

Dec. 5, 1950     H. L. ANDERSON     2,532,874
DETECTION APPARATUS
Filed Dec. 13, 1945     4 Sheets—Sheet 1

Witnesses:
Herbert E. Metcalf
Paul J. Glaister

Inventor:
Herbert L. Anderson
By
Attorney

Dec. 5, 1950 — H. L. ANDERSON — 2,532,874
DETECTION APPARATUS
Filed Dec. 13, 1945 — 4 Sheets-Sheet 2

Inventor:
Herbert L. Anderson

Dec. 5, 1950 H. L. ANDERSON 2,532,874
DETECTION APPARATUS
Filed Dec. 13, 1945 4 Sheets-Sheet 3

Witnesses:
Herbert E. Metcalf
Paul J. Glaister

Inventor:
Herbert L. Anderson
By
Attorney.

Dec. 5, 1950      H. L. ANDERSON      2,532,874
DETECTION APPARATUS
Filed Dec. 13, 1945      4 Sheets-Sheet 4
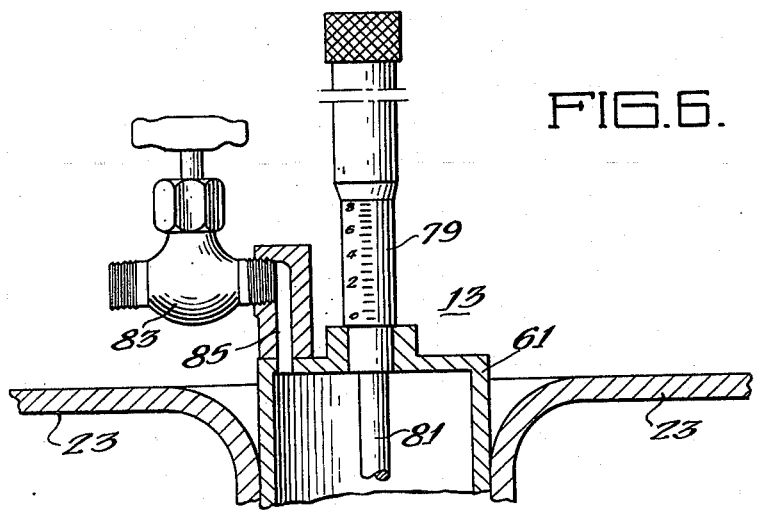
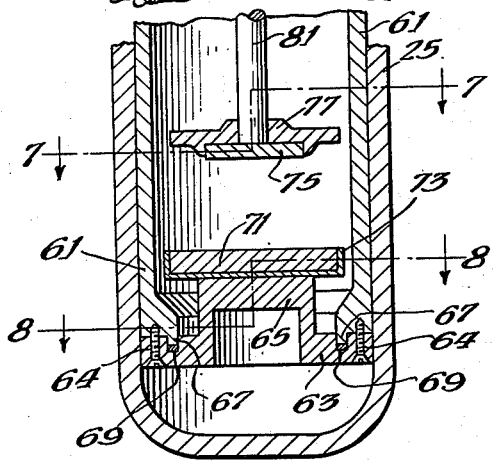
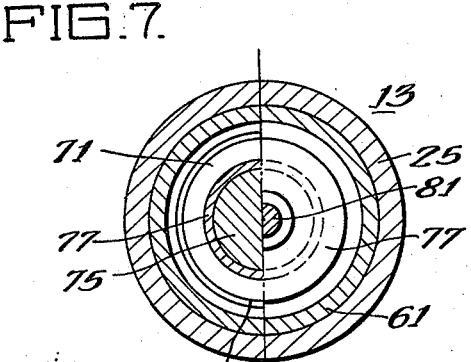
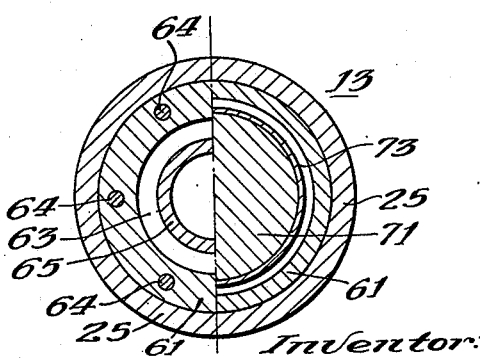
Inventor:
Herbert L. Anderson

Patented Dec. 5, 1950

2,532,874

UNITED STATES PATENT OFFICE 2,532,874

DETECTION APPARATUS

Herbert L. Anderson, Hartford, Conn., assignor to the United States of America as represented by the United States Atomic Energy Commission Application December 13, 1945, Serial No. 634,862

26 Claims. (Cl. 250—27.5)

The present invention relates to an improved apparatus for the detection and counting of neutrons.

In certain physical procedures as, for example, the measurement of the number of neutrons yielded in nuclear reactions of the $a,n$ type, during which nucleii bombarded by high energy alpha particles incorporate such particles into their nuclear structure and simultaneously eject a neutron, an instrument of very high neutron detecting and counting efficiency must be used. The apparatus heretofore available in the art does not possess the sensitivity and accuracy required for this purpose, and has proven unsatisfactory. The principal object of the present invention, therefore, is to provide an improved, highly sensitive means for accomplishing the detection and numerical counting of neutrons, and particularly, the neutrons which are liberated as an incident to $a,n$ nuclear reactions.

Figure 2:
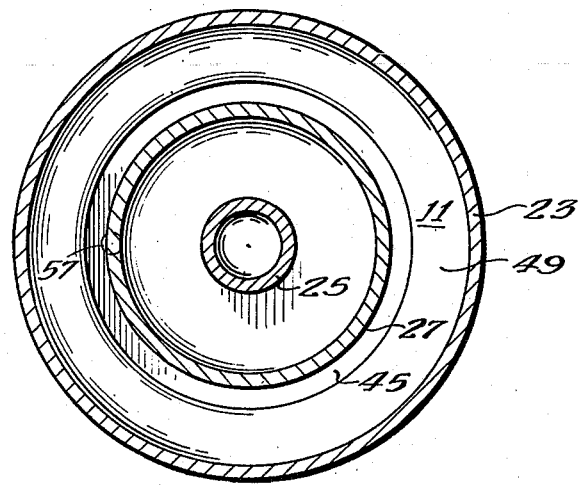
Figure 3:
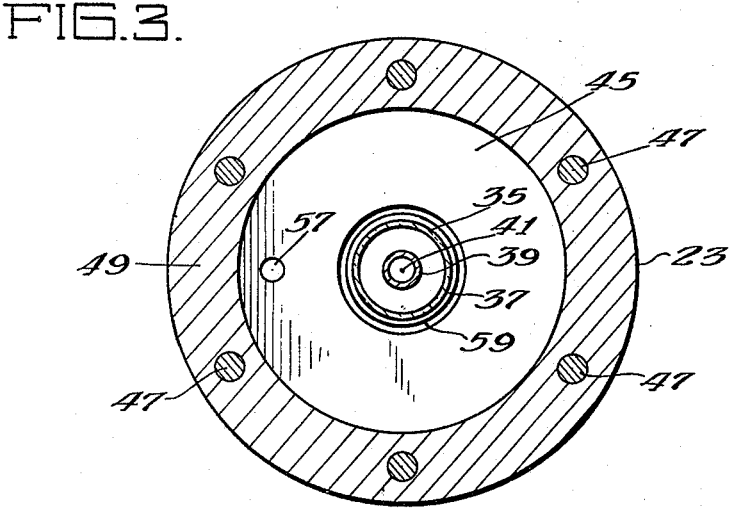
Figure 4:
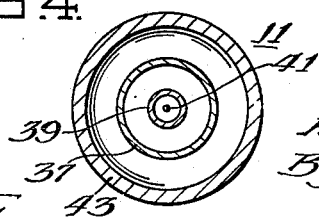
Figure 5:
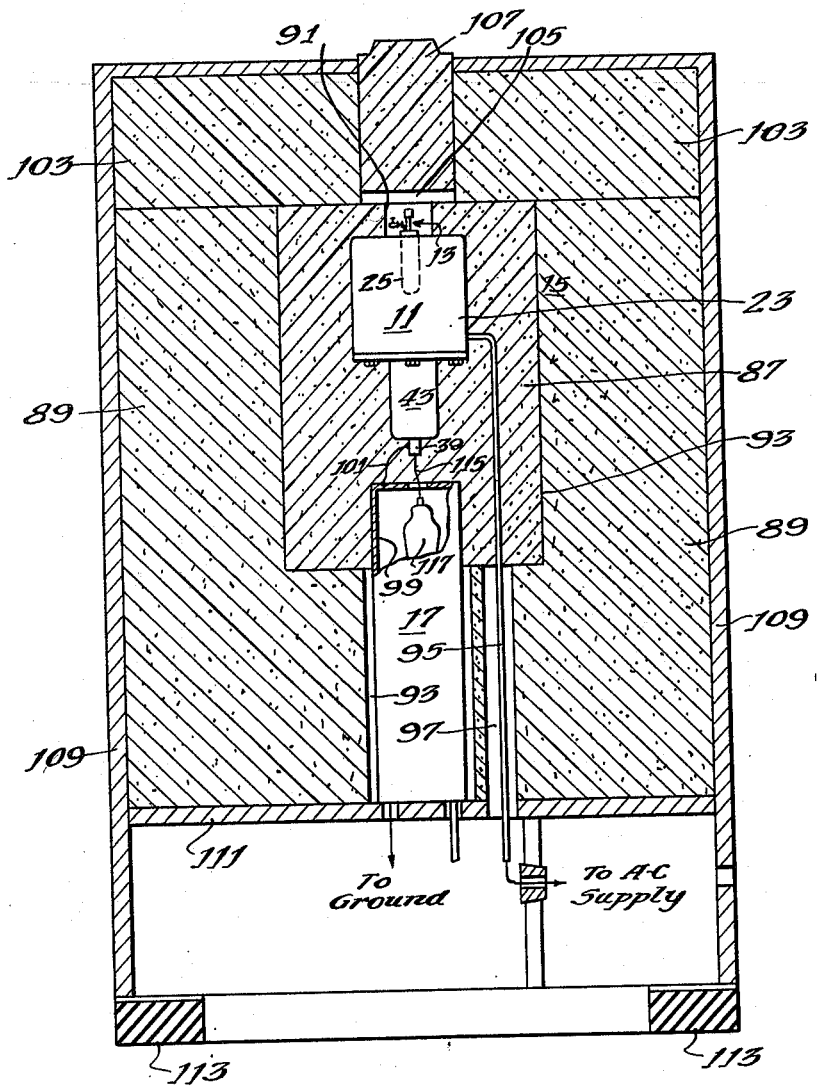

As will hereinafter appear, the object of the invention is accomplished by the provision of a neutron detection and counting system of novel design, which includes an improved ionization chamber structure together with an improved combination alpha particle source and holder for the sample under test. The various features and advantages of the invention will be made more apparent in the accompanying drawings and in the following description of one preferred embodiment thereof. In the drawings:

Fig. 1 is a sectional view through an ionization chamber constructed in accordance with the present invention, a diagrammatic representation of the electrical circuit of the complete apparatus being shown in operative connection therewith;

Figs. 2, 3, and 4 are, respectively, sectional views on the lines 2—2, 3—3, and 4—4 of Fig. 1;

Fig. 5 is a sectional view showing a preferred arrangement of the ionization chamber, a neutron reflecting and moderating structure used in connection with the chamber, and certain of the other structural elements of the system of the invention;

Fig. 6 is an enlarged, sectional view of the combination alpha particle source and sample holder of the invention; and Figs. 7 and 8 are, respectively, section views on the lines 7—7 and 8—8 of Fig. 6.

Generally stated, the neutron detection and counting apparatus of the present invention includes four main elements. These are: the ionization chamber 11, which is illustrated particularly in Figs. 1 to 4; the combination alpha particle source and sample support 13, which is illustrated particularly in Figs. 6, 7, and 8; the neutron reflecting and moderating structure 15, illustrated in Fig. 5, which serves as a means for slowing the neutrons to be detected to low energies and for maintaining their density high in the neighborhood of the ionization chamber; and the electronic units, which include a preamplifier 17, a linear amplifier and counter 19, and a high voltage D.-C. supply 21 for the ionization chamber 11. The output from the ionization chamber 11 is fed into the preamplifier 17 which is desirably located closely adjacent the chamber, and the output from the preamplifier 17 is conducted to the input side of the linear amplifier 19, as shown in Figure 1.

The ionization chamber 11 includes a generally cup-shaped main envelope or outer closure 23, which is preferably in the form of a right cylinder and which is provided with a relatively deep, cylindrical, reentrant portion 25 at the closed end thereof. This outer closure 23 should be made of a material which is permeable to neutron radiation, and in order to simplify the design of the chamber, it may be made of a conducting material, such as aluminum. When made of conducting material, the outer closure 23 is utilized as the outer electrode of the ion chamber. The inner electrode 27 is of cup-shape, and is supported within the outer electrode or closure 23 so as to surround the cylindrical, reentrant portion 25 with substantially uniform spacing therebetween.

The support means for the inner electrode 27 comprises a multiple glass-to-metal seal structure which includes two cup-shaped members 29 and 31 of metal, a tubular member 33 also of metal, and two tubular sections 35 of glass. The several members comprising the inner electrode support means are of substantially the same diameter, and are joined together by four glass-to-metal seals 37, as shown in Fig. 1. The upper end of the cup-shaped metal member 29 is conductively and mechanically attached to the lower end of the electrode 27. The other cup-shaped metal member 31 supports an elongated tubular member 39, preferably cylindrical in form, which is adapted to enclose an insulated lead-in conductor 41 to the inner electrode 27 through the metal member 29. The tubular member 39 is insulated from the other portion of the ion chamber by the tubular insulators 35, and it is normally grounded, thereby serving as a guard or shield ring for the lead-in conductor 41, as is conventional in ionization chamber construction. The tubular conducting member 33, which comprises the lower end of the seal structure, is welded to a cup-shaped support 43 which in turn is fixedly attached to an annular plate member 45. This plate member 45 is bolted to the lower end of the main closure 23 by a series of symmetrically spaced cap screws 47. The lower end of the main closure 23 is thickened, as illustrated at 49, to accommodate the cap screws 47; and the engaging surfaces of the closure 23 and the plate 45 are provided with interengaging parts 51 which, in combination with a suitable gasket 53, provide a gas-tight seal for the closure, while at the same time permitting easy disassembly of the structure.

During use it is desired that the ion chamber 11 shall be filled with boron trifluoride ($BF_3$) at a pressure of about 80 cms. of mercury, this material having the property of becoming ionized when subjected to neutron irradiation. While normal boron trifluoride is satisfactory the sensitivity of the device can be considerably enhanced by the use of boron trifluoride which is enriched in the isotope of boron of mass ten, $B^{10}$. The desired enrichment can be conveniently accomplished by mixing boron trifluoride made from the isotope $B^{10}$ and normal boron trifluoride. If maximum sensitivity is desired the $B^{10}$ gas may be used without dilution.

To facilitate the introduction of the neutron-responsive gas into the ionization chamber, the device includes a suitable valve 55, which is mounted in the annular plate member 45 and which communicates with the interior of the device through a passageway 57. The plate member 45 also includes a centrally disposed opening 59 of sufficient size to clear the multiple seal support for the inner electrode 27.

The combination alpha particle source and sample holder 13, which is illustrated in Figs. 6, 7, and 8, includes a cylindrical, cup-shaped, outer casing 61 which is closed at its lower end by a circular plate member 63 having an inwardly projecting boss or platform 65 formed therein. The plate member 63 is fastened in place by screws 64, as illustrated, and the engaging surfaces of the plate member 63 and the casing 61 desirably include interfitting parts 67 for engaging a gasket 69 to provide a gas-tight seal. The sample of the material which is to be subjected to alpha particle irradiation is supported upon the inner face of the platform 65 by any convenient means. A flat, circular sample 71 adapted to be held in place by a cup-shaped holder 73 is illustrated in the drawings, but it will be understood that the sample might be of a different shape, or might be a powder or liquid, etc.

The source of alpha particle radiation used in this particular device comprises a circular plate 75 of polonium ($Po^{210}$) which is supported upon an annular support member 77 directly above, and in line with, the sample platform 65. The isotopes of polonium, as is known, have the property of emitting alpha particle radiation during the normal decay of such isotopes to more stable neucleii. The 210 isotope exhibits a half-life characteristic of alpha particle emission of about 136 days which particularly adapts it for use as an alpha particle source. In order to extend the range of the device, it is desirable that means be available whereby the source of alpha radiation can be located at various distances from the sample under test. This is conveniently accomplished by the use of a micrometer screw support 79 which is connected to the source holder 77 by a rod member 81. By this means, the source plate 75 may be moved toward or away from the sample 71 which is supported upon the platform 65, and the micrometer scale provides a continuous indication of the relative position of the parts. It will usually be found desirable to evacuate the interior of the source and sample holder means 13, and to this end, the outer closure 61 is provided with a valve 83 of any suitable design, the valve 83 in the structure illustrated communicating with the interior of the closure through a tubular member 85.

The dimensions of the combination source and sample holder means 13 should be such that the device will fit within the cylindrical depression provided by the reentrant portion 25 at the end of the ionization chamber closure 23, and it is shown in this position in Figs. 1 and 6.

It will be apparent that with the structure described, the ions formed within the ion chamber 11, as a result of the irradiation of the boron trifluoride contained within that chamber by the neutrons liberated due to the alpha particle bombardment of the sample material, have a very short path of movement within the chamber. For this reason most of the pulses produced by the neutron disintegration of boron have the same size; on the other hand the background pulses which come from alpha particle contamination emitted from the walls of the chamber have different sizes. The associated electronic equipment is designed to discriminate in favor of the pulses produced by boron disintegration and record those preferably over the pulses of different size. This improves the ratio of neutron produced pulses over those of the background.

The operating circuit, as previously stated, is illustrated diagrammatically in Fig. 1. The guard ring shield member 39, one side of the input to the preamplifier 17, and the negative side of the high voltage direct current supply 21 are grounded. The positive side of the high voltage direct current supply is connected to the outer casing 23 which thus serves as the high voltage electrode. The inner ion chamber electrode 27 is connected to the other side of the preamplifier input, and the preamplifier output is fed directly to the linear amplifier and counter 19. The preamplifier 17, the linear amplifier and counter 19 and the high voltage direct current supply 21 may all comprise electronic systems of known design, and do not constitute a part of the present invention.

As previously stated the ionization chamber 11 is enclosed within a neutron reflecting and moderating structure, as illustrated at 15 (Fig. 5). The structure 15 preferably comprises at least six inches of hydrogenous material, such as paraffin, although other known neutron slowing or moderating materials such as heavy water, $D_2O$, carbon, or beryllium can be used at some sacrifice to the sensitivity of the device. The structure 15 has the functions of slowing the neutrons passing into and through the ionization chamber from the sample, thereby assuring that substantially all such neutrons will be slowed to detectable energies, and of reflecting or directing the slowed neutrons into the ionization chamber so as to maintain maximum neutron density in the region of the chamber 11. Paraffin has an additional advantage in that it is a good electrical insulator, and the structure illustrated at 15 is of that material. The structure 15 is in two parts 87 and 89. The inner part 87 is cylindrical in form and is conveniently made by casting a block of paraffin about the ionization chamber 11 and the upper end of the preamplifier 17 as is illustrated in Fig. 5. An opening 91 is provided to permit access to the reentrant portion 25 in order that the source and sample holder 13 may be put in place, and the complete unit comprising portion 87, the ion chamber 11, and the preamplifier 17 is adapted to slide into a suitable opening 93 provided in the outer section 89. The high voltage connection to the outer casing 23, which serves as the outer electrode of the ionization chamber 11, is made via a conducting tube 95 which is held in place by the cast paraffin inner portion 87 and which extends through an opening 97 in the outer portion 89. The preamplifier 17 is enclosed within a metallic shield 99 as illustrated. The shield 99 is connected to the tubular guard ring member 39 by a suitable conductor 101, and both members are grounded. A cast paraffin block 103 fits over the two shield portions 87 and 89, and block 103 is provided with a central opening 105, normally closed by a removable plug 107, to permit access to the recessed upper end of the ionization chamber 11. Desirably, the entire paraffin block shield structure is reinforced by a suitable framework, as indicated at 109 and 111, and this framework may be supported upon resilient blocks 113 to minimize microphonic disturbances.

The very close spacing of the ionization chamber structure 13 and the preamplifier 17, made possible by the disclosed arrangement, permits the use of a very short connection 115 from the lead-in conductor 41 for the inner electrode 27 to the first tube 117 of the preamplifier. This further aids in increasing the efficiency of the system.

During the operation of the device, a sample of the material under test will be placed upon the sample support platform 65 within the combination alpha particle source and sample holder 13. The ambient conditions within the holder 13 will be adjusted to those desired, either by evacuation of the interior of the device, or by the introduction of a gas thereinto. The position of the alpha particle source plate 75 relative to the sample will normally be adjusted by operation of the micrometer screw 79 when the measuring operation starts, although a preliminary adjustment may be made at this time.

The combination particle source and sample holder 13 is then introduced into the recess at the end of the ion chamber provided by the reentrant portion 25, and the shield plug 107 is put in place. Upon energization of the amplifiers and counter means 17 and 19, and the high voltage direct current supply 21, the system is ready for operation. Calibration may be effected by introducing samples of known neutron activity into the recess provided by the reentrant portion 25. In actual test, the apparatus has proven more efficient than known neutron detection and counting means. It is accurate, extremely sensitive, and has a low background effect being capable of measuring in a few hours the output from $\alpha,n$ nuclear reactions yielding as small an output as one neutron per second, a degree of sensitivity heretofore considered practically unattainable. The features of the invention which are believed to be new are set forth in the appended claims.

What is claimed is:

1. An ion chamber for use in connection with apparatus of the class described, comprising an outer closure of a conductive material which is permeable to neutron particle radiation, said closure serving as one of the electrodes of said ion chamber and having a reentrant portion which defines a recess for containing a sample of material under test, and a generally cup-shaped inner electrode supported within, and insulated from, said outer closure in such position that it surrounds said reentrant portion.

2. An ion chamber for use in connection with apparatus of the class described, comprising a sealed outer closure of a conductive material which is permeable to neutron particle radiation, said closure containing a gas which becomes ionized when subjected to neutron irradiation, said closure being adapted to serve as one of the electrodes of said ion chamber and having a reentrant portion which defines a recess for containing a sample of material under test, and a generally cup-shaped, inner electrode supported within, and insulated from, said outer closure in such position that it surrounds said reentrant portion.

3. An ion chamber for use in connection with apparatus of the class described, comprising a sealed outer closure of a conductive material which is permeable to neutron particle radiation, said closure containing a gas which becomes ionized when subjected to neutron irradiation, said closure being adapted to serve as one of the electrodes of said ion chamber and having a reentrant portion at one end thereof which defines a recess for containing a sample of material under test, a generally cup-shaped, inner electrode, and means including a glass-to-metal seal for supporting said inner electrode within, and for insulating said inner electrode from, said outer closure, said inner electrode being disposed in such position that it surrounds said reentrant portion, thereby minimizing the path of ion movement within said chamber.

4. An ion chamber for use in connection with apparatus of the class described, comprising a sealed, cylindrically shaped, outer closure of a conductive material which is permeable to neutron particle radiation, said closure serving as one of the electrodes of said ion chamber, having a cylindrical reentrant portion disposed centrally of one end thereof which defines a recess for containing a sample of material under test, and containing a gas which becomes ionized when subjected to neutron irradiation, a cylindrical, cup-shaped, inner electrode, and means including a glass-to-metal seal for supporting said inner electrode within, and for insulating said inner electrode from, said outer closure, said inner electrode being supported concentrically of said reentrant portion and surrounding that portion, thereby minimizing the path of ion movement within said chamber.

5. An ion chamber for use in connection with apparatus of the class described, comprising a sealed, cylindrically shaped, outer closure of a conductive material which is permeable to neutron particle radiation, said closure serving as one of the electrodes of said ion chamber, having a cylindrical reentrant portion disposed centrally of one end thereof which defines a recess for containing a sample of material under test, and containing a gas which becomes ionized when subjected to neutron irradiation, a cylindrical, cup-shaped, inner electrode, a lead-in connection for said inner electrode, a tubular guard ring shield for said lead-in connection, and means including a multiple glass-to-metal seal structure which supports said inner electrode within, and which insulates said inner electrode from, said outer closure, said seal structure also supporting said guard ring shield in such position that it encloses said lead-in connection and insulating said guard ring shield from said outer closure, from said inner electrode, and from said lead-in connection, said inner electrode being supported concentrically of said reentrant portion and surrounding that portion, thereby minimizing the path of ion movement within said chamber.

6. An ion chamber as defined in claim 2 wherein the gas contained in said closure comprises boron trifluoride.

7. An ion chamber as defined in claim 2 wherein the gas contained in said closure comprises boron trifluoride enriched with the separated isotope boron ten.

8. An ion chamber as defined in claim 3 wherein the gas contained in said closure comprises boron trifluoride.

9. An ion chamber as defined in claim 3 wherein the gas contained in said closure comprises boron trifluoride enriched with the separated isotope boron ten.

10. In combination in apparatus of the class described, an ion chamber comprising an outer closure of a conductive material which is permeable to neutron particle radiation, said closure serving as one of the electrodes of said ion chamber and having a reentrant portion which defines a recess for containing a sample of material under test, a generally cup-shaped inner electrode supported within, and insulated from, said outer closure in such position that it surrounds said reentrant portion, and a neutron slowing and reflecting means disposed about said ion chamber.

11. In combination in apparatus of the class described, an ion chamber comprising a sealed outer closure of a conductive material which is permeable to neutron particle radiation, said closure containing a gas which becomes ionized when subjected to neutron irradiation, said closure being adapted to serve as one of the electrodes of said ion chamber and having a reentrant portion which defines a recess for containing a sample of material under test, a generally cup-shaped, inner electrode support within, and insulated from said outer closure in such position that it surrounds said reentrant portion, and a neutron slowing and reflecting means of a neutron moderating material disposed about said ion chamber.

12. In combination in apparatus of the class described, an ion chamber comprising a sealed outer closure of a conductive material which is permeable to neutron particle radiation, said closure containing a gas which becomes ionized when subjected to neutron irradiation, said closure being adapted to serve as one of the electrodes of said ion chamber and having a reentrant portion at one end thereof which defines a recess for containing a sample of material under test, a generally cup-shaped inner electrode, means including a glass-to-metal seal supporting said inner electrode within said outer closure in such position that it surrounds, and is substantially uniformly spaced from, said reentrant portion, said seal means insulating said inner electrode from said outer closure, and a neutron slowing and reflecting means disposed about said ion chamber.

13. In combination in apparatus of the class described, an ion chamber comprising a sealed, cylindrically shaped outer closure of a conductive material which is permeable to neutron particle radiation, said closure serving as one of the electrodes of said ion chamber, having a cylindrical reentrant portion disposed centrally of one end thereof which defines a recess for containing a sample of material under test, and containing a gas which becomes ionized when subjected to neutron irradition, a cylindrical, cup-shaped, inner electrode, and means including a glass-to-metal seal for supporting said inner electrode within said outer closure in such position that it surrounds said reentrant portion, said inner electrode being supported concentrically of said reentrant portion and being insulated therefrom, and a neutron slowing and reflecting means of a hydrogenous neutron moderating material disposed about said ion chamber.

14. In combination in apparatus of the class described in an ion chamber comprising a sealed, cylindrically shaped, outer closure of a conductive material which is permeable to neutron particle radiation, said closure serving as one of the electrodes of said ion chamber, having a cylindrical reentrant portion disposed centrally of one end thereof which defines a recess for containing a sample of material under test, and containing a gas which becomes ionized when subjected to neutron irradiation, a cylindrical, cup-shaped, inner electrode, a lead-in connection for said inner electrode, a tubular guard ring shield for said lead-in connection, and means including a multiple, glass-to-metal, insulating, seal structure which supports said inner electrode within said outer closure in such position that said inner electrode surrounds, and is substantially uniformly spaced from, said reentrant portion, said seal means insulating said inner electrode from said outer closure and supporting said guard ring shield in such manner that said shield encloses said lead-in connection, and is insulated from said outer closure and from said inner electrode and said lead-in connection, and a neutron slowing and reflecting means on a neutron moderating material disposed about said ion chamber.

15. Apparatus as defined in claim 11 wherein the gas contained in said closure comprises boron trifluoride.

16. Apparatus as defined in claim 11 wherein the gas contained in said closure comprises boron trifluoride enriched with the separated isotope boron ten.

17. Apparatus as defined in claim 12 wherein the gas contained in said closure comprises boron trifluoride.

18. Apparatus as defined in claim 12 wherein the gas contained in said closure comprises boron trifluoride enriched with the separated isotope boron ten.

19. In combination in apparatus of the class described, an ion chamber comprising an outer closure of a conductive material which is permeable to neutron particle radiation, said closure serving as one of the electrodes of said ion chamber and having a reentrant portion which defines a relatively deep recess, and a generally cup-shaped inner electrode supported within, and insulated from, said outer closure in such position that it surrounds said reentrant portion, and a combination alpha particle source and sample holder disposed within said recess.

20. In combination in apparatus of the class described, an ion chamber comprising a sealed outer closure of a conductive material which is permeable to neutron particle radiation, said closure containing a gas which becomes ionized when subjected to neutron irradiation, said closure being adapted to serve as one of the electrodes of said ion chamber and having a reentrant portion at one end thereof which defines a relatively deep recess, and a generally cup-shaped, inner electrode supported within, and insulated from, said outer closure in such position that it surrounds said reentrant portion with substantially uniform spacing therebetween, and a combination alpha particle source and sample holder disposed within said recess.

21. In combination in apparatus of the class described, an ion chamber comprising a sealed, cylindrically shaped outer closure of a conductive material which is permeable to neutron particle radiation, said closure serving as one of the electrodes of said ion chamber, having a relatively deep, cylindrically shaped, reentrant portion which is disposed centrally of one end thereof and which defines a relatively deep recess, and containing a gas which becomes ionized when subjected to neutron irradiation, a cylindrical cup-shaped, inner electrode, and means including a glass-to-metal seal for supporting said inner electrode within, and for insulating said inner electrode from said outer closure, said inner electrode being supported concentrically of said reentrant portion and surrounding that portion with substantially uniform spacing therebetween, and a combination alpha particle source and sample holder disposed within said recess.

22. In combination in apparatus of the class described, an ion chamber comprising a sealed, cylindrically shaped, outer closure of a conductive material which is permeable to neutron particle radiation, said closure serving as one of the electrodes of said ion chamber, having a relatively deep cylindrically shaped, reentrant portion disposed centrally of one end thereof, and containing a gas which becomes ionized when subjected to neutron irradiation, a cylindrical, cup-shaped inner electrode, a lead-in connection for said inner electrode, a tubular guard ring shield for said lead-in connection, and means including a multiple glass-to-metal seal structure which supports said inner electrode within, and which insulates said inner electrode from said outer closure, said seal structure also supporting said guard ring shield in such position that it encloses said lead-in connection and insulating said guard ring shield from said outer closure, from said inner electrode, and from said lead-in connection, said inner electrode being supported concentrically of said reentrant portion and surrounding that portion, and a combination alpha particle source and sample holder, which includes a cylindrical outer casing, fitting within said recess.

23. In combination in apparatus of the class described, an ion chamber comprising an outer closure of a conductive material which is permeable to neutron particle radiation, said closure serving as one of the electrodes of said ion chamber and having a reentrant portion which defines a relatively deep recess, and a generally cup-shaped inner electrode supported within, and insulated from, said outer closure in such position that it surrounds said reentrant portion, a combination of alpha particle source and sample holder disposed within said recess, and a neutron slowing and reflecting means disposed about said ion chamber.

24. In combination in apparatus of the class described, an ion chamber comprising a sealed outer closure of a conductive material which is permeable to neutron particle radiation, said closure containing a gas which becomes ionized when subjected to neutron irradiation, said closure being adapted to serve as one of the electrodes of said ion chamber and having a reentrant portion at one end thereof which defines a relatively deep recess, and a generally cup-shaped, inner electrode supported within, and insulated from, said outer closure in such position that it surrounds said reentrant portion with substantially uniform spacing therebetween, a combination alpha particle source and sample holder disposed within said recess, and neutron slowing and reflecting means of a hydrogenous, neutron moderating material disposed about said ion chamber.

25. In combination in apparatus of the class described, an ion chamber comprising a sealed, cylindrically shaped outer closure of a conductive material which is permeable to neutron particle radiation, said closure serving as one of the electrodes of said ion chamber, having a relatively deep cylindrically shaped reentrant portion which is disposed centrally of one end thereof and which defines a relatively deep recess, and containing a gas which becomes ionized when subjected to neutron irradiation, a cylindrical cup-shaped inner electrode, means including a glass-to-metal seal for supporting said inner electrode within, and for insulating said inner electrode from said outer closure, said inner electrode being supported concentrically of said reentrant portion and surrounding that portion with substantially uniform spacing therebetween, a combination alpha particle source and sample holder disposed within said recess, and a neutron slowing and reflecting means disposed about said ion chamber.

26. In combination in apparatus of the class described, an ion chamber comprising a sealed, cylindrically shaped, outer closure of a conductive material which is permeable to neutron particle radiation, said closure serving as one of the electrodes of said ion chamber, having a relatively deep cylindrically shaped reentrant portion, disposed centrally of one end thereof, and containing a gas which becomes ionized when subjected to neutron irradiation, a cylindrical, cup-shaped, inner electrode, a lead-in connection for said inner electrode, a tubular, guard ring, shield for said lead-in connection, means including a multiple glass-to-metal seal structure which supports said inner electrode within, and which insulates said inner electrode from, said outer closure, said seal structure also supporting said guard ring shield in such position that it encloses said lead-in connection and insulating said guard ring shield from said outer closure, from said inner electrode, and from said lead-in connection, said inner electrode being supported concentrically of said reentrant portion and surrounding that portion, a combination alpha particle source and sample holder, which includes a cylindrical outer casing, fitting within said recess, and a neutron slowing and reflecting means of a neutron moderating material disposed about said ion chamber.

HERBERT L. ANDERSON.

REFERENCES CITED

The following references are of record in the file of this patent:

UNITED STATES PATENTS

| Number | Name | Date |
|---|---|---|
| 1,569,494 | Hurd | Jan. 12, 1926 |
| 1,914,935 | Wolf et al. | June 20, 1933 |
| 2,206,634 | Fermi et al. | July 2, 1940 |
| 2,302,247 | Neufeld | Nov. 17, 1942 |
| 2,303,688 | Fearon | Dec. 1, 1942 |
| 2,405,572 | Friedman | Aug. 13, 1946 |